Oct. 31, 1967

E. JUSTI 3,350,229

METHOD AND APPARATUS FOR STORING GASEOUS FUEL
FOR THE OPERATION OF FUEL CELLS

Filed Jan. 25, 1963

INVENTOR
Eduard Justi
BY  *Erich M. H. Radde*
AGENT

INVENTOR
Eduard Justi
BY
AGENT

Oct. 31, 1967     E. JUSTI     3,350,229
METHOD AND APPARATUS FOR STORING GASEOUS FUEL
FOR THE OPERATION OF FUEL CELLS
Filed Jan. 25, 1963     3 Sheets-Sheet 3

INVENTOR
Eduard Justi
BY
AGENT

United States Patent Office 3,350,229
Patented Oct. 31, 1967

3,350,229
METHOD AND APPARATUS FOR STORING GASEOUS FUEL FOR THE OPERATION OF FUEL CELLS
Eduard Justi, Braunschweig, Germany, assignor to Siemens-Schuckertwerke, Berlin and Erlangen, Germany, and Varta Aktiengesellschaft, Frankfurt am Main, Germany, both corporations of Germany
Filed Jan. 25, 1963, Ser. No. 253,844
Claims priority, application Germany, Jan. 27, 1962, S 77,753
7 Claims. (Cl. 136—86)

The present invention relates to improvements in the operation of fuel cells, and more particularly to an improved system for storing gaseous fuel for operating such cells.

In the art of energy conversion, the direct and useful conversion of the chemical energy of conventional fuels into electrical energy has within recent years attracted particular attention because fuel cells require no mechanically moving parts, operate without noise or perceptible odor and may reach a high degree of efficiency.

At this stage of the development of fuel cells, practically required levels of efficiency can be attained only with the use of hydrogen as fuel. Gaseous hydrogen reacts so rapidly that very high current densities may be obtained in electro-chemical devices operating therewith. Ideally, the reaction product on burning of the hydrogen with the oxidizing gas in the fuel cell is pure water which does not corrode the electrodes, does not use up the electrolyte, and thus imparts to the fuel cell a long service life.

If hydrogen fuel cells have not yet been widely used commercially, the main reason may reside in the very difficult problems encountered in handling and storing hydrogen. Hydrogen ($H_3$) is liquefied only at extremely low temperatures, i.e., $-253°$ C. At room temperatures, hydrogen is usually stored in strong steel bottles under a pressure of about 100 atmospheres to 200 atmospheres. Such a storage system is highly uneconomical in terms of weight as well as volume.

It should be noted that, while hydrogen itself has so far been found to give the required efficiency to fuel cells which makes them commercially practicable, it is certain that within the near future hydrogen-containing fuels, such as any hydrocarbon which is gaseous at room temperatures and particularly such hydrocarbons which contain a high proportion of hydrogen to carbon, including the saturated and unsaturated aliphatic hydrocarbons, will also be successfully used for this purpose.

It is the primary object of the present invention to provide a storage system for gaseous fuels, which makes a simpler and more economical handling of the fuels possible than has been heretofore available.

This object is accomplished in accordance with this invention by adsorbing, and thus storing, a gaseous fuel at very low temperatures. The storage temperature is of the order of the boiling temperature of oxygen at pressures not exceeding atmospheric pressure. The adsorbed fuel is then released from storage by desorption.

The hydrogen or hydrogen-containing gaseous fuel may be adsorbed on any suitable conventional adsorbent carrier, such as activated charcoal, silica gel, kieselguhr, activated aluminum oxide, diatomaceous earth, fuller's earth, fluorites, and the like. While such low-temperature adsorption has been considered heretofore as uneconomical, this objection has been overcome according to this invention by making use of the low temperature of the liquefied oxygen for this purpose, which is required for the operation of high-efficiency fuel cells. In other words, the low temperature of the hydrogen adsorption is obtained by heat exchange with the liquefied oxygen stored at atmospheric pressure or lower.

Thus, the synergetic storing of the liquefied oxidizing gas needed for the operation of the fuel cell and the fuel, which is also required for the fuel cell operation, produces a storage system with advantages which cannot be obtained, and could not be expected, from the separate storage of these gases under similar physical conditions.

These advantages will be described hereinbelow in connection with the storage of hydrogen but it is obvious that like advantages will be obtained in the storage of similar gaseous fuels:

(1) It is known that the higher the boiling point of a gas, the stronger its adsorption. Therefore, all impurities in the hydrogen will be retained on the adsorbent carrier when the stored hydrogen is desorbed because of all the gases in question only helium has a lower boiling point than hydrogen gas in any practical sense. In other words, since all the practically occurring impurities in hydrogen have a higher boiling point than hydrogen, they will remain adsorbed at temperatures at which the hydrogen is desorbed from the adsorbent carrier. Thus, the hydrogen is purified by fractionated desorption and hydrogen gas of a very high degree of purity is delivered to the fuel cell, thus increasing its efficiency. Such high purification cannot be accomplished economically in other systems and storing the fuel in adsorbed condition and releasing the stored fuel by desorption thus greatly increases the operating efficiency of the entire electro-chemical conversion process.

Even hydrogen fuel cells which can operate with impure hydrogen suffer from decreasing voltages and a reduction of the maximum attainable current densities during operation if they do not have special devices for eliminating the inert gas pockets from the tiny pores of the hydrogen diffusion electrode, which are due to an accumulation of impurities. Particularly where sudden high loads are involved, such fuel cells will fail.

(2) An energy of only a few hundred calories per mole is released by the adsorption and is required for the desorption of the fuel on the adsorbent carrier, i.e. less than 1% of the total calorific power. Thus, desorption does not use up any appreciable part of the electrical energy producible by the burning of the fuel gas. Furthermore, the adsorption storage of the fuel is dependable because the low temperature of the adsorbent carrier is accurately maintained by heat exchange with the boiling oxygen. Every millimeter of mercury change in the pressure of the oxygen produces a boiling temperature change of only $0.01°$ C. Thus, simple control of the oxygen pressure accurately controls the adsorption and desorption of the fuel.

(3) The control of the hydrogen pressure in the storage system of this invention is particularly easy because, with an unchanged amount of adsorbate, the adsorption pressure increases exponentially with its absolute temperature, analogous to the boiling temperature of oxygen, according to the following equation (Riedel "Chem. Ing. Techn." vol. 26 (1954), pages 83 and 259):

$$\log p = 4.20358 - 372.808/T - 0.000620$$

T ($kp$/sq. cm.) wheren $p$ is the pressure and T is the absolute temperature.

Thus, while according to the above equation, the hydrogen pressure ($p_H$) varies similarly to the oxygen pressure with the absolute temperature T when the adsorbed amount of hydrogen remains constant, this pressure $p_H$ depends at a constant absolute temperature on the amount of hydrogen adsorbed and stored per cubic centimeter of adsorbent carrier (cu. cm. of $H_2$/cu. cm. of adsorbent carrier), approximately according to the Volmer-Langmuir law $$a = p_H/(k + \beta \cdot p_H)$$

wherein $\beta$ is the extent of coverage of the inner surface of the adsorbent carrier, $a$ is the amount of adsorbate, and $k$ is a constant.

This means that, at the beginning of the adsorption and as long as $k$ is larger than $\beta \cdot p_H$, the adsorbed and stored amount of hydrogen increases proportionally to the hydrogen pressure. As additional amounts of hydrogen are delivered to the adsorbent carrier, a saturation value $a\infty$ is reached which constitutes a measure of the maximum receptivity of the adsorbent carrier at the given temperature.

For the practical usefulness of the present invention, it is essential how large this limiting value $a\infty$ is at the technically useful storage temperature. At the boiling point of oxygen under atmospheric pressure, i.e. at $-183°$ C. or about 90° K., more than 100 cc. of hydrogen may be adsorbed on 1 cc. of conventional activated charcoal. For coconut coal, R. Jaeckei, "Kleinste Drucke, ihre Messung und Erzeugung." (Lowest Pressures, their Measurement and Production), Berlin, 1950, mentions a limiting saturation value $a\infty = 135$ cc. of $H_2$ per cc. of coconut coal at a hydrogen sorption pressure $p$ of one atmosphere. In this case, an amount of hydrogen is stored which, in the ideal gas state, would have to be compressed at $-183°$ C. under a pressure of 45 atmospheres, at 0° C. at 135 atmospheres, and at 27° C. (room temperature) at 148 atmospheres. The deviations of hydrogen from the ideal gas state have the effect that, differently from other gases, except for helium, hydrogen in its actual gas state will have to be under an even higher pressure to attain the same density as it has in sorption. If hydrogen were to be permanently stored in its gaseous state, it would thus require a pressure of about 150 atmospheres and, considering allowance for occasional rises in temperature, steel bottles for the storage of the hydrogen would have to be dimensioned for withstanding pressures up to at least about 200 atmospheres. Such hydrogen containers would be extremely heavy.

Comparing the advantage of adsorbing and storing the hydrogen according to this invention on an activated charcoal carrier having a temperature of 90° K. with hydrogen sorption on palladium or a palladium-silver alloy, it will be noted that the same volume of the noble metal catalyst will, at 300° K., chemisorb an amount of hydrogen equivalent to hydrogen under about 135 atmospheres pressure but the costs are incomparably higher. Furthermore, available amounts of palladium would hardly suffice to store larger amounts of hydrogen required for commercial operations of a fuel cell installation. In contrast to this, activated charcoal is very cheap and available readily in any desired quantity. Its apparent density is about 0.44 g./cu. cm., compared with the apparent density of 11.5 g./cu. cm. of palladium. Thus, considering the weight of the adsorbent carrier, deep cooled activated charcoal stores hydrogen at a rate exceeding that of palladium by an order of magnitude of an exponent of about one and a half tens (4) Finally, the amount of the required sorption energy and its reversibility is to be considered.

As is known, the quantity of sorption heat $Q_{rev}$ required for a constant amount $a$ of adsorbate may be calculated from the sorption pressure as a function of the corresponding temperature approximately analogously to the evaporation of a liquefied gas according to the Clausius-Clapeyron law.

$$Q_{rev} = R \cdot T^2 (dNp/dT)$$

wherein the gas constant $R = 1.986$ calories per mole degree (C.°), T is the absolute temperature, $d$=differential, $N$=natural logarithm and $p$=gas pressure.

Even without detailed discussion, this equation shows clearly that the sorption heat rapidly decreases with decreasing temperature which has been described as one of the advantages of the invention under (2) hereinabove.

The quantity of sorption heat depends not only on the temperature but also on the degree of saturation of the adsorbent carrier with the adsorbate, the first adsorbed $H_2$ molecules being bonded to the carrier more strongly than the last-adsorbed molecules.

An average value of adsorption heat has been found with activated charcoal to be about 920 calories per mole. The actually measured desorption energy was found to meet the above-mentioned Clausius-Clapeyron equation but is considerably smaller than the heat energy used for adsorption, which is simply determined by the amount of evaporated oxygen having an evaporation heat of $Q_{evap} = 1630$ calories per mole. It was found that about 400 additional calories are needed to cool down one mole of $H_2$ of 300° K. and approximately the same amount of heat energy to cool the activated charcoal and its container to 90° K.

In accordance with a preferred embodiment of this invention, a doubling of the required cooling energy for the storage of the hydrogen is avoided by using a heat exchanger which makes use of the enthalpy of the evaporating oxygen between 90° K. and 300° K. to withdraw the enthalpy of the inflowing warm gaseous fuel. It was found that a small difference still remains in the energy balance ("Ann.d.Phys." vol. 9, (1931), page 570) because technically available normal hydrogen consists of one part by volume of para-$H_2$ and three parts by volume of ortho-$H_2$ while the adsorbed hydrogen is a mixture of equal parts by volume of ortho-hydrogen and para-hydrogen. If the heat exchanger were ideally dimensioned, the enthalpy of one mole of evaporated oxygen could be used to cool about 1.3 mole of hydrogen to 90° K., to enrich it with para-$H_2$ and to adsorb it. To this energy requirement must be added the single cooling energy for lowering the temperature of the adsorbent carrier, preferably activated charcoal, and the carrier container.

The apparent density of liquid oxygen is 1.12 g./cc. = 1.12/32 = 0.035 moles/cc. If 135 cc. of hydrogen are adsorbed under normal conditions on 1 cc. of activated charcoal, this is 135/22430 = 0.006 moles/cc. Thus, the molar densities of the stored oxygen and the stored hydrogen have a ratio of 6:1. Since the complete electrochemical conversion in the fuel cell requires twice as much hydrogen than oxygen molecules, the storage space for the hydrogen must be about twelve times as large as that for the oxygen unless a more efficient adsorbent carrier is used for the hydrogen and/or the storage temperature is lowered and/or the storage pressure is increased. However, even with a 12-fold volume of hydrogen adsorbent, it should be noted that activated charcoal (apparent density about 0.4 g./cc.) is about three times as light as liquefied oxygen so that the hydrogen storage container will weigh only about four times as much as the oxygen tank.

With the above considerations in view, the present invention provides, in the operation of a fuel cell by delivering a normally gaseous fuel, preferably hydrogen, and an oxidizing gas, such as oxygen or air, to respective fuel cell electrodes, a method of storing the fuel, which comprises the steps of storing a gas, preferably the fuel cell oxidizing gas, such as oxygen, air, or mixtures of oxygen and air, in liquefied condition at its boiling temperature, delivering the gaseous fuel and adsorbing said fuel for storage. The gaseous fuel may be delivered at ambient temperature but it may be pre-cooled, if desired, to expedite the adsorption in the storage container. It is also possible to deliver the gaseous fuel at a somewhat elevated temperature. The delivered and the adsorbed fuel are in heat exchange relation with the gas and thus cooled approximately to its temperature.

The rate of adsorption and desorption of the fuel may be controlled by changing the pressure of the liquefied gas to change its boiling temperature and the corresponding temperature of the adsorbed fuel which is in heat exchange relation therewith.

Heat energy may be supplied to the liquefied gas to evaporate the same and to the adsorbed fuel to desorb the same for delivery to the fuel cell. This heat energy supply is preferably controlled by the operating pressure of the fuel cell electrodes.

According to one feature of the invention, at least a portion of the liquefied gas may be stored at subatmospheric pressure while the adsorbed and stored fuel may be stored at superatmospheric pressure.

Furthermore, a fluid medium which evaporates in the range of the boiling temperature of the liquefied gas may be conducted through the adsorbed fuel in heat exchange relation therewith, this fluid medium preferably being the liquefied gas itself.

In one embodiment of the invention, the fuel is first conducted through, and in heat exchange relation with, at least one adsorption station serving to supply fuel to an operating fuel cell. On its passage through such a station, the fuel is precooled and the precooled fuel is then delivered to a final adsorption station which has been cooled to the boiling temperature of the liquefied gas, where it is stored until needed.

The adsorbent carrier for the fuel is preferably a non-metallic substance, such as carbon, i.e. activated charcoal, a gel, for instance, activated silica gel, or diatomaceous earth.

The fuel storage installation of the present invention comprises a tank of heat-conductive material, preferably metal, for storing the liquefied gas, an inlet means for delivering the liquefied gas to the tank, an outlet means for removing evaporating liquefied oxidizing gas from the tank, a storage container of heat-conductive material, preferably metal, for storing the fuel, and a fuel adsorbent carrier arranged in the container. Another inlet means is provided for delivering the gaseous fuel into the storage container for adsorption on the adsorbent carrier and this other inlet means is arranged in heat exchange relation with the evaporating liquefied gas and with the liquefied gas itself whereby the fuel is cooled to the boiling temperature of the liquefied gas on its way to the storage container. An insulating means, such as a jacket, separates the tank and the storage container from the ambient temperature. If desired, a common insulating jacket may be provided to surround the tank and the container, and this jacket preferably defines an interspace at least with the fuel storage tank, means being provided to evacuate the interspace.

The container has another outlet means for desorbed fuel. The fuel inlet means and the oxidizing gas outlet means are preferably arranged in heat exchange relation.

In accordance with a preferred embodiment, heat-conductive means preferably comprising a plurality of metallic elements defining interspaces permitting free communication between all portions of the container interior, such as perforated metal sheets, spaced rods, nets and the like, are distributed throughout the interior of the container and in heat-conductive contact therewith to distribute the prevailing temperature more evenly throughout the container interior.

According to another preferred embodiment a heat-conductive shield, preferably of metal, is connected to the tank and surrounds the fuel storage container, the shield defining an interspace with the container.

For evaporating the liquefied gas and desorbing the fuel, heating means is arranged for the tank and the container. This heating means is preferably controlled by manometer means, such as a contact manometer, operated by the pressure of the fuel cell electrodes. It may comprise electrical resistance heating means which is operated by an electric circuit connecting the heating coils to the output of the fuel cell. It may further, or instead, comprise heat-conductive means, such as conduit means, leading from the ambient atmosphere to the tank and container, in which case a fluid medium having a freezing point below the temperature of the tank and container is preferably circulated through the heat-conductive means to prevent condensation and/or freezing.

The above and other objects, advantages, and features of the present invention will become more apparent in connection with the following detailed description of certain preferred embodiments thereof, taken in conjunction with the accompanying drawing wherein FIG. 1 is a cross sectional schematic view of one embodiment of an apparatus for storing gaseous fuel;

Figure 4:
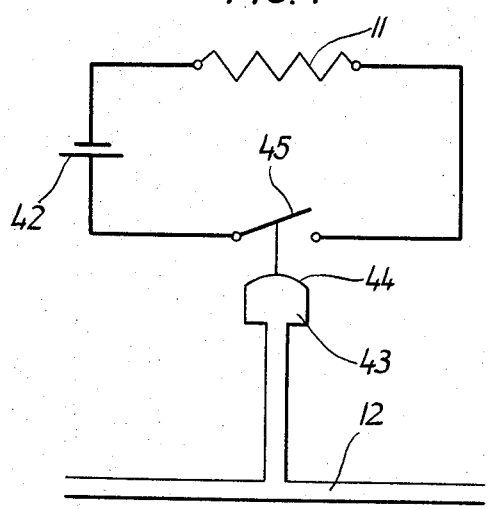
Figure 5:
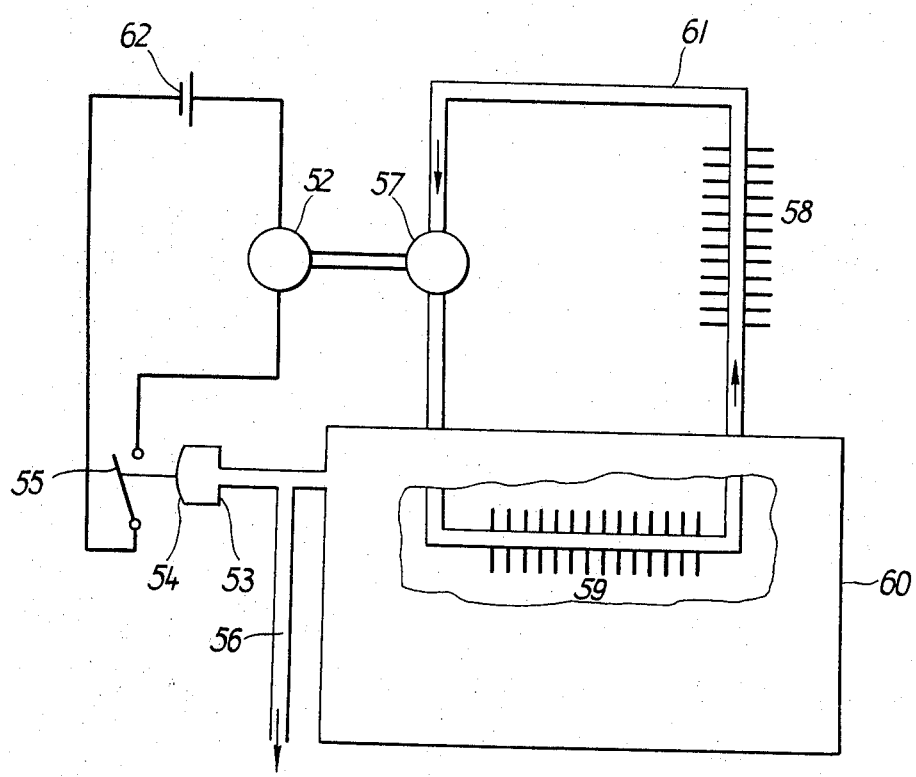
Figure 6:
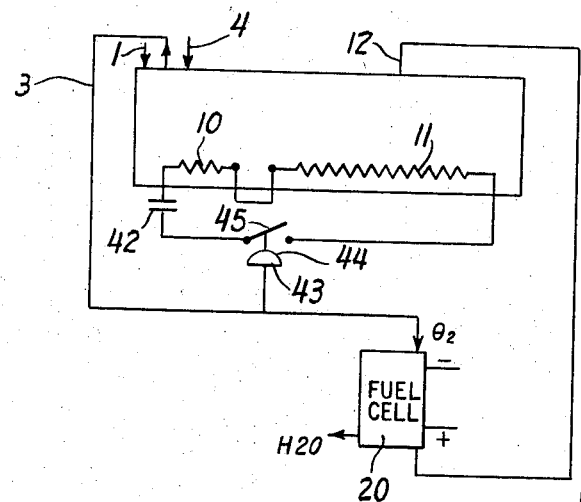

FIG. 4 diagrammatically indicates the electric control circuit for the heating means;

FIG. 5 diagrammatically shows a closed circuit between the ambient atmosphere and the storage container for heating the same; and FIG. 6 diagrammatically shows an apparatus wherein the heat energy supply is regulated by the operating pressure of the fuel cell electrodes.

Figure 1:
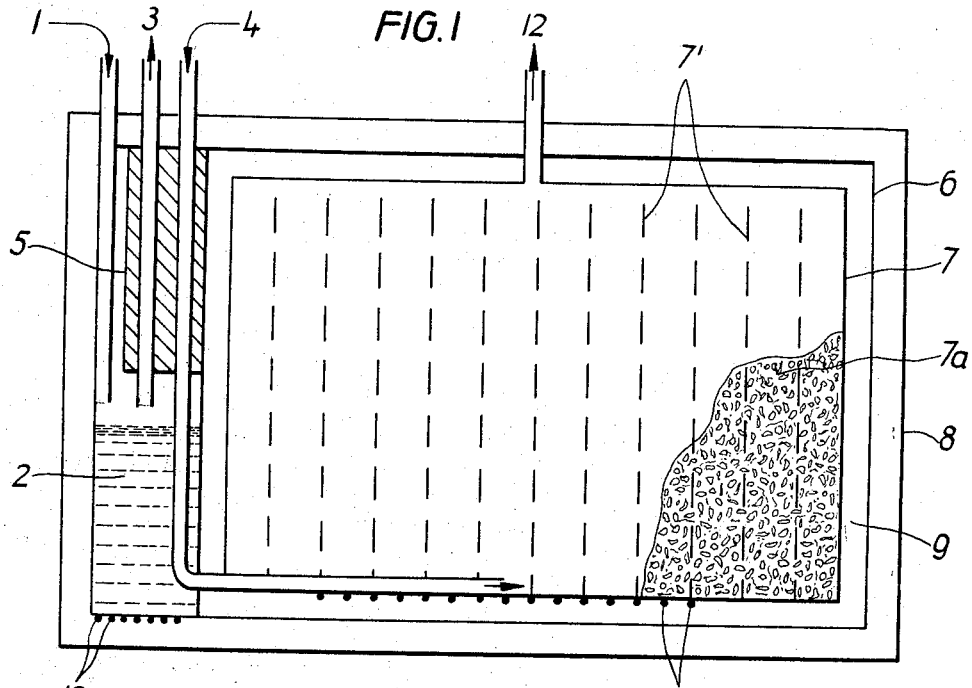

Referring first to FIG. 1, there is shown a heat-conductive tank 2, for instance, of steel, for holding a supply of liquefied oxygen. The liquefied oxygen is introduced into the tank by inlet conduit 1 from a source of supply (not shown). An exhaust conduit 3 permits oxygen vapor to escape from tank 2.

Gaseous hydrogen is supplied to the apparatus from a supply source (not shown) through inlet conduit 4. The gaseous oxygen exhaust 3 and the gaseous hydrogen inlet 4 are arranged in heat exchange relationship to form a conventional heat exchanger 5 of any suitable construction, such as a Linde or Hampson type heat exchanger, as disclosed in Chemical Engineer's Handbook, 3rd edition, pages 1713–1716, McGraw-Hill Book Company, Inc., 1950.

As will be obvious to the skilled in the art, the hydrogen could be replaced by another gaseous hydrogen-containing fuel, such as a lower aliphatic hydrocarbon, and another oxidizing gas, such as air or a mixture of air and oxygen, may be used instead of pure oxygen, the description proceeding on the basis of pure hydrogen and oxygen for the sake of simplicity.

The hydrogen inlet conduit 4 leads to heat-conductive fuel storage container 7, preferably also of metal, such as steel, which contains the adsorbent material 7a for adsorbing the hydrogen and storing the adsorbed hydrogen. A heat-conductive shield 6, for instance, of metal, such as steel, surrounds the hydrogen storage container 7 and maintains it in heat exchange relation with tank 2 to reflect heat radiated by, or emanating from, the adsorbent hydrogen system in container 7. In the illustrated embodiment, the metallic shield 6 surrounds the entire storage container 7, the tank 2 and the storage container 7 being arranged adjacent each other. A preferably evacuated interspace is left between the walls of storage container 7 and the walls of shield 6 and tank 2. The entire structure is heat-insulated by a suitable insulating jacket 8, for instance, of highly porous, poorly heat-conducting materials, such as asbestos, glass wool, slag or mineral wool, and the like, to contain the low temperature therein. In the illustrated embodiment, this jacket surrounds the tank 2 and the storage container 7 but it is obvious that separate heat-insulating jackets may be provided for the tank and the storage container.

In smaller storage systems, additional heat insulation may be obtained by producing a high vacuum, for instance, in the range of 0.0001 mm. Hg to 0.01 mm. Hg, in the interspace 9 while such a procedure may not be practically feasible in large installations where this object may be obtained by filling the interspace with a suitable poor heat conducting material such as mentioned hereinabove to reduce or prevent heat flow from the ambient atmosphere (about 300° K.) to the oxygen and hydrogen containers (about 90° K.).

The hydrogen or fuel gas storage container 7 preferably houses a plurality of transverse walls 7' of perforated sheet metal, metal nets, or like apertured separating walls to obtain a better temperature equilibrium inside the container and thus to distribute the heat energy needed for the desorption of the gaseous fuel, such as hydrogen, evenly throughout the container.

Heat energy is used to gasify the liquefied oxygen and hydrogen for supply to the fuel cell (not shown). The gasified or vaporized oxygen escapes from tank 2 through exhaust conduit 3 whence it is conducted to the fuel cell while the desorbed hydrogen leaves the storage container 7 through exhaust conduit 12 leading to the fuel cell. The simplest manner of producing the required heat energy is the generation of heat in an electric conductor according to Joule's law, i.e. by arranging heating coils 10 and 11 around the oxygen tank 2 and the hydrogen storage container 7, respectively.

An electrical control circuit for heating coil 11 is, by way of example, illustrated in FIG. 4. As shown, power is supplied from a suitable voltage source 42 which heats the resistance coil 11 when the switch 45 is closed. Contact manometer 43 is mounted on the fuel outlet conduit 12 and, at a given gas pressure in the conduit, the manometer membrane 44 opens switch 45. When the fuel cell has used up so much fuel that the gas pressure in conduit 12 drops below this predetermined point, membrane 43 is deflated, thus pulling switch 45 into its closed position, heating the coil and causing hydrogen desorption.

According to Joule's law, the quantity of heat generated by a steady electric current is proportional to the resistance of the conductor in which the heat is generated to the square of the current and to the time of its duration. Taking into consideration the above-given energy balances, sufficient oxygen vaporizing and hydrogen desorption heat will be generated when a very small fraction of an order of magnitude of less than 1% of the direct current produced by the fuel cell is conducted to the heating coils. This very simple heating circuit has the concomitant result that exactly the same amounts of oxygen and hydrogen are released from storage and thus supplied to the fuel cell as are being used up at the hydrogen electrode and at the cathode in the cell.

The inertia encountered in thermal phenomena, i.e. the evaporation of the oxygen and the desorption of the hydrogen, produces a time lag between the use of the gases in the fuel cell and their supply from storage. This time lag, however, is bridged by the gases chemisorbed in the respective fuel cell electrodes. Thus, the gases coming from the storage installation replace in the electrodes the amounts of $O_2$ and $H_2$ gases desorbed therefrom during the operation of the cell.

According to the present invention, the gases are evolved in the storage installation easily and in accurate amounts since the same amount of heat releases about twice as much hydrogen as oxygen in accordance with the stoichiometric needs of the fuel cell. Therefore, only a small portion of the heat coil means, for instance, of the hydrogen storage container, need to be adjustable to change the proportion of heat supplied to the oxygen tank and hydrogen container, respectively, in proportion to the progressive hydrogen release from the adsorbent material in the container.

One practical way of controlling the small fraction of direct current conducted from the fuel cell to the heat coils to effect evaporation of the oxygen and desorption of the hydrogen is the use of contact manometers which are operated by the operating pressure of the two fuel cell electrodes.

As indicated, the heat energy required for the release of the gases for operation of the fuel cell uses only a tiny fraction of the generated current but this may be further reduced if this heat is simply obtained from the temperature gradient between the ambient temperature (about 300° K.) and the storage installation temperature (about 90° K.). This requires only the elimination of the following relatively minor difficulties:

If the ambient air were led directly to the very low temperature storage installation tank and container, its moisture and carbon dioxide contents would be condensed thereon. If the apparatus is used on ships and heat regulation were effected by conducting water to the oxygen tank and hydrogen container, the water would immediately freeze and further water supply would be prevented. In this case, however, a closed circuit of a liquid having a low freezing temperature, such as anhydrous alcohol or pentane, may be interposed as a heat transfer medium. (See FIG. 5 described hereinbelow.) In this system of generating the required evaporation and desorption heat, the only energy needed for supplying the gases to the fuel cell from the storage installation is that required to operate a pump for circulating the heat transfer medium at sufficient speed to prevent it from freezing during its passage through the storage container.

The heat energy supply system, i.e. either the heating coils 10, 11 or the heat transfer medium circulating system used in its place or supplementing it, must be capable of occasionally raising the temperature of the oxygen tank 2 and the hydrogen storage container 7 beyond that required for the evaporation of oxygen and the desorption of hydrogen so that residual impurities, such as carbon dioxide, water and the like, which do not evaporate at these low temperatures may be released and pumped out of the storage installation.

Figure 2:
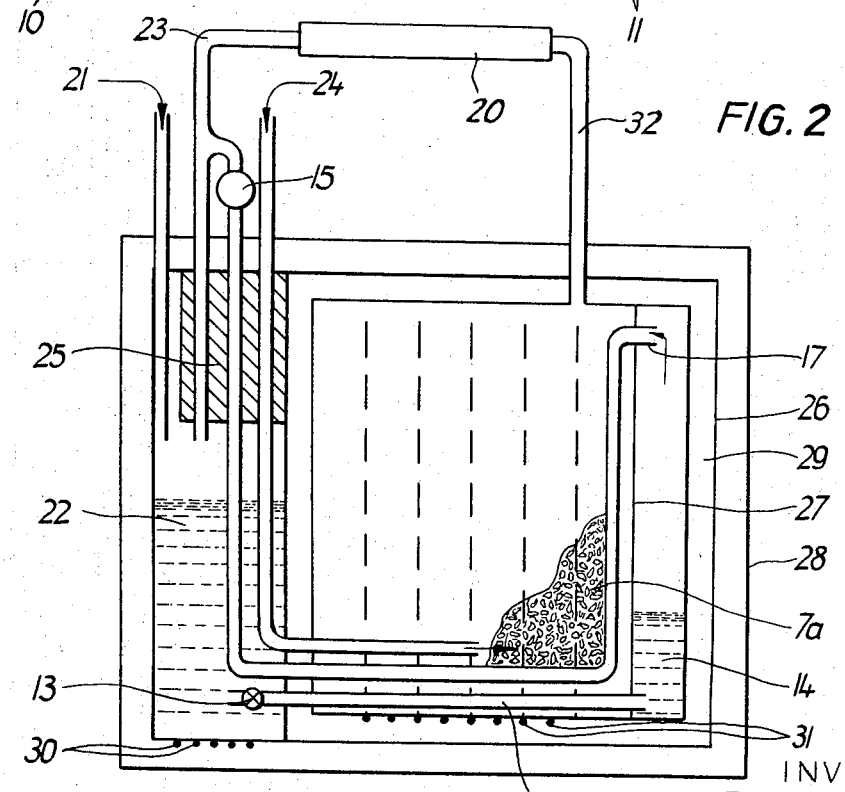
FIG. 2 is a similar view of another embodiment of such an apparatus.

FIG. 2 illustrates a modified embodiment of a storage installation according to the present invention. This embodiment is particularly useful for systems which are less concerned with the costs of the hydrogen storage than with the lowest possible ratio of space and weight per volume of stored hydrogen. In this embodiment, use is made of the above-mentioned fact that the adsorbed amount $a$ of hydrogen progressively increases with a decrease in temperature. Therefore, the hydrogen is not adsorbed and stored at the boiling temperature of oxygen at atmospheric pressure (90° K.) but at a temperature down to 54° K. which is generated by the evaporation of liquefied oxygen at reduced pressures down to 2 mm. Hg. For this purpose, a small fraction of the liquid oxygen boiling at atmospheric pressure in tank 22 is conducted through conduit 16 to auxiliary tank 14 which is evacuated by a rotary vacuum pump 15 the intake 17 of which is connected to the auxiliary tank. The oxygen pressure may be readily controlled by a mercury manometer on the pump. The flow of liquid oxygen from tank 22 to auxiliary tank 14 is controlled by valve 13 in conduit 16.

In other respects, the storage installation operates similarly to that of FIG. 1. Liquefied oxygen is introduced into tank 22 through inlet conduit 21 and exhaust conduit 23 permits oxygen vapor to escape and to be supplied to the fuel cell 20. Gaseous hydrogen is supplied to storage container 27 through inlet conduit 24. As in the embodiment of FIG. 1, the hydrogen inlet conduit forms a heat exchanger 25 with the oxygen exhaust conduit. The vacuum pump intake conduit 17, which carries oxygen evaporated under reduced pressure, also leads through the liquefied tank 22 and heat exchanger 25 so that the part of its very low temperature which is not used to cool further the hydrogen storage container 27 is transferred to the oxygen boiling under atmospheric pressure in tank 22 thus reducing its evaporating speed and further reducing the temperature of the incoming gaseous fuel, as it passes through heat exchanger 25. In this manner, the evaporation rate of the oxygen in tank 22 is reduced and the adsorbed amount $a$ of hydrogen may be about doubled per volume and weight of hydrogen adsorption material, similarly reducing the size of the storage container 27 holding this material.

As in the embodiment of FIG. 1, the desorbed hydrogen gas is fed to the fuel cell 20 through exhaust conduit 32 and the storage container is surrounded by a heat shield 26 defining an insulating interspace 29 with the storage container. The entire storage installation is encased in insulating jacket 28 and heat coils 30 and 31 are provided for supplying oxygen evaporation and hydrogen desorption heat, respectively.

Figure 3:
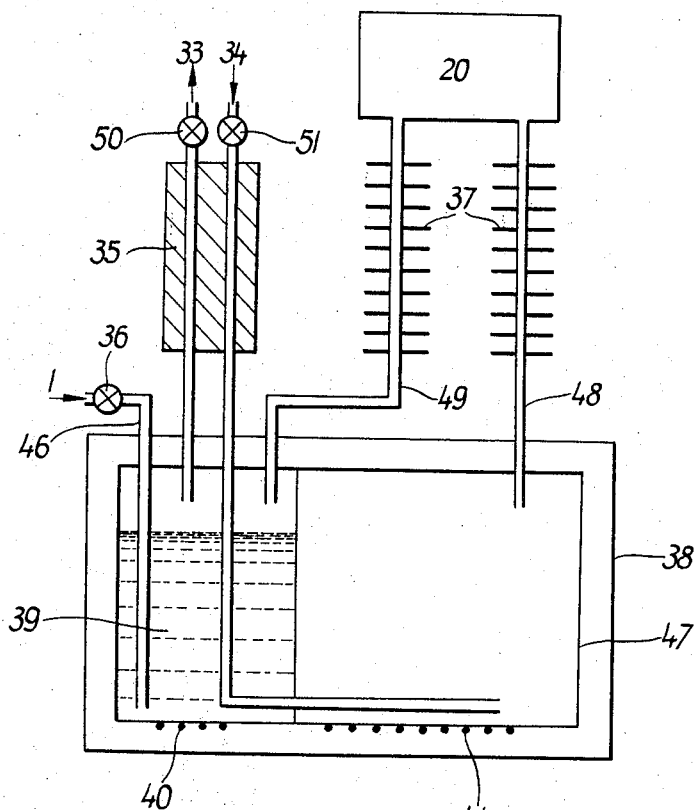
FIG. 3 is a similar view of yet another embodiment of a fuel cell installation.

In many respects, the embodiment of FIG. 3 is similar to that of FIG. 1 and only as much of it will be described as deviates therefrom. The heat exchange unit 35 for the evaporating oxidizing gas outlet 33 and the gaseous fuel inlet 34 is arranged outside the insulating jacket 38 in this modification of the apparatus, the incoming gaseous fuel being cooled by the oxidizing gas exhaust. Otherwise, the structure is similar to that of FIG. 1, i.e. liquefied oxidizing gas is supplied to the tank 39 through inlet conduit 46 and the tank is in heat exchange contact with storage container 47 for the fuel, the fuel inlet 34 leading through the oxidizing gas tank 39 into the container 47 and tank 39 and container 47 being heatable by coils 40 and 41. Tank and container are surrounded by heat insulating jacket 38.

The fuel cell 20 receives the oxidizing gas from tank 39 through outlet pipe 49 and the gaseous fuel from storage container 47 through outlet pipe 48, a heat exchanger 37 surrounding the gas outlet pipes so as to heat the oxidizing gas and gaseous fuel to the required operating temperature of the cell.

The arrangement of FIG. 3 may be operated continuously or discontinuously although normally discontinuous operation will be carried out, i.e. gaseous fuel is stored, the fuel cell is operated by a supply of gaseous fuel from the storage container and when the container is exhausted, a new supply of gaseous fuel is stored, etc. To control gas flow into and out of the storage installation, valves are arranged in the respective conduits, valve 36 controlling the delivery of liquefied oxidizing gas through inlet conduit 46 and valve 51 controlling the delivery of fuel through inlet conduit 34. Valve 50 controls the escape of evaporating oxidizing gas from tank 39.

FIG. 5 diagrammatically illustrates heating of the storage installation by a closed circuit between ambient atmosphere and storage container 60 for the fuel, the heating control electrical circuit being similar to the one shown in FIG. 4. Thus, if the fuel cell has used up so much gaseous fuel coming from storage container 60 through fuel outlet conduit 56 that the gas pressure in conduit 56 is reduced to a value below a predetermined level, the membrane 54 of the contact manometer 53 will pull the control switch 55 to its closed position so that power from voltage source 62 will operate electric motor 52. Motor 52 then operates pump 57 mounted in the closed conduit 61 which extends from the ambient atmosphere into the gaseous fuel storage container 60, as shown. A heat exchange fluid medium, such as any suitable liquid having a freezing temperature below the temperature of the storage container, is thus circulated through the closed conduit 61, absorbing heat from heat exchanger 58 and transferring it to heat exchanger 58 and transferring it to heat exchanger 59 within the storage container. This heat exchanger is in thermal contact with the adsorbent carrier in the storage container and thus raises its temperature to produce the necessary desorption heat required to desorb fuel and permit desorbed gaseous fuel to be exhausted through conduit 56 until the pressure in this conduit has risen above the predetermined level, at which point the membane of the contact manometer will be pressed outwardly, as shown in the drawing, to open the electrical control circuit and stop circulation of heat exchange medium in closed conduit 61.

The embodiment of FIG. 6 internally and in some other respects is similar to that of FIG. 1, to which an electrical control circuit for heating coils 10 and 11, similar to that shown in FIG. 4, has been added. In FIG. 6, the oxidizer gas pressure in line 3 fluctuates in response to the rise and fall of the operating pressure in the fuel cell 20 electrodes. In operation, when the fuel cell 20 pressure falls, manometer membrane 44 collapses, closing the switch 45, completing a circuit between battery 42 and heating elements 10 and 11. Oxidizer liquid evaporates and fuel deadsorbs to raise the pressure through lines 3 and 12 in the fuel cell 20 electrodes. The diaphragm then rises, breaking the circuit, cutting off the heaters 10 and 11, and stopping evaporation and desorption.

The following calculations will show the amount of potential electrical energy stored by the storage installation of the present invention, assuming a storage volume of one cubic meter of liquefied oxygen of atmospheric pressure and an equivalent volume (about 6 to 12 times as much) of hydrogen:

Since one cubic centimeter contains 1.12 g. of liquefied oxygen at atmospheric pressure, 32 g.=1 mole $O_2$ has a volume of about 30 cc. Thus, 1 cc. of liquefied oxygen contains $3.3 \times 10^4$ moles $O_2$. Assuming complete electrochemical conversion of this amount of oxygen in the fuel cell, $4 \times 96.500$ amp./sec. is produced per mole, i.e. $1.27 \times 10^{10}$ amp./sec. is produced per cubic meter. With a negligible current density, a hydrogen fuel cell can deliver a terminal voltage of 1.12 v., so that a maximum of about 4000 kilowatt hours are obtained. When the current density is 50 ma./sq. cm. and the operating temperature of the fuel cell is 85° C., the terminal voltage is decreased to 0.9 v. Thus, a storage installation of the indicated volume would be capable of storing potential electrical energy amounting to about 3000 kilowatt hours per cubic meter of stored oxygen.

It is also significant that fuel cells supplied with operating gases from a storage installation of the herein disclosed type may be subjected, at least temporarily, to considerable excess loads without substantially reducing their efficiency because the hydrogen storage container releases hydrogen purified by fractionated desorption and such a pure fuel gas prevents the inhibition of electrode catalyst activity due to pockets of inert gas impurities.

While the invention has been described in connection with certain now preferred embodiments, it will be evident to the skilled in the art that many variations and modifications may occur to the expert, particularly after benefiting from the present teaching, without departing from the spirit and scope of this invention as defined in the appended claims.

I claim:

1. In the operation of a fuel cell by delivering a normally gaseous hydrogen fuel and oxygen to respective fuel cell electrodes, a method of synergetically storing the hydrogen and the oxygen, said method comprising the steps of storing the oxygen in liquefied condition at its boiling temperature at no more than atmospheric pressure, separating a minor portion of the liquefied oxygen, maintaining the separated minor portion of the liquefied oxygen under vacuum, removing evaporated oxygen from the separated minor portion of the liquefied oxygen, delivering the gaseous hydrogen, passing the delivered hydrogen in indirect heat exchange relation with the removed evaporated oxygen and with the liquefied oxygen to an adsorbent carrier, the hydrogen thereby being cooled below said boiling temperature, maintaining the adsorbent carrier in indirect heat exchange relation with the liquefied oxygen and with the removed evaporated oxygen, storing the adsorbed hydrogen on said carrier, raising the temperature of the liquefied oxygen to evaporate the same and of the adsorbed hydrogen to desorb the same, and delivering the evaporated oxygen and the desorbed hydrogen to the fuel cell electrodes of a fuel cell.

2. A fuel storage installation for operating a fuel cell by delivering gaseous hydrogen and oxygen to respective fuel cell electrodes, said installation comprising in combination with a fuel cell having electrodes for generating electrical energy a main metallic tank for storing liquefied oxygen at its boiling temperature, an inlet means for delivering the liquefied oxygen to the main tank, an outlet means for removing evaporating oxygen from the main tank, a metallic storage container for storing hydrogen, hydrogen adsorbent means arranged in the storage container, another inlet means for delivering gaseous hydrogen into the storage container for adsorption and storage on the adsorbent means, an auxiliary metallic tank for the liquefied oxygen arranged in indirect heat exchange relation with the hydrogen storage container, an auxiliary conduit passing through the storage container and connecting the main tank with the auxiliary tank, an adjustable valve means in the auxiliary conduit for controlling the liquefied oxygen flow through the auxiliary conduit into the auxiliary tank, an auxiliary outlet means for evaporating liquefied oxygen in said auxiliary tank, the auxiliary outlet means leading through the storage container into the first-named outlet means, an adjustable vacuum pump in the auxiliary outlet means for reducing the pressure in the auxiliary tank, said oxygen outlet means and other hydrogen inlet means being arranged in indirect heat exchange relation and the other hydrogen inlet means passing through the liquefied oxygen in the main tank and hence into the storage container whereby the hydrogen is cooled to said temperature, a metallic shield connected to the main tank and surrounding the hydrogen storage container, the shield defining an interspace with the container and the main tank and container defining an interspace therebetween, heating means arranged to heat the main tank and the container for evaporating liquefied oxygen and desorbing hydrogen, respectively, a heating insulating jacket surrounding the main tank, the auxiliary tank, and the storage container whereby they are separated from the ambient temperature, and another outlet means for the desorbed hydrogen leading from the container through the shield and jacket.

3. In the operation of a fuel cell by delivering a normally gaseous fuel and an oxidizing gas to respective fuel cell electrodes, a method of storing and using the fuel and oxidizing gas, said method comprising the steps of storing an oxidizing gas in liquefied condition at its boiling temperature, delivering the gaseous fuel and adsorbing the fuel for storage, the delivered and the adsorbed fuel being in indirect heat exchange relationship with the liquefied gas and thus being cooled, supplying heat energy to the liquefied gas to evaporate the same and to the adsorbed fuel to desorb the same for delivery to the respective electrodes of a fuel cell, controlling the heat energy supply by the operating pressure of the fuel cell electrodes, deadsorbing stored fuel as needed to operate said fuel cell, evaporating oxidizing gas as needed to operate said fuel cell and flowing said deadsorbed fuel and evaporated oxidizing gas to the fuel cell electrodes.

4. A fuel storage installation for operating a fuel cell by delivering a normally gaseous fuel and an oxidizing gas to respective fuel cell electrodes, said installation comprising, in combination with a fuel cell having electrodes for generating electrical energy, a tank for storing a gas in liquefied condition at its boiling temperature, an inlet means for delivering the liquefied gas to said tank, an outlet means for removing evaporating liquefied gas from the tank, a storage container for storing the fuel, a fuel adsorbent carrier arranged in said storage container, another inlet means for delivering the gaseous fuel into said storage container for adsorption on said adsorbent carrier, said other inlet means being arranged in heat exchange relation with the evaporating liquefied gas and with said liquefied gas whereby said fuel is cooled on its way to the storage container, insulating means separating the tank and the storage container from the ambient temperature, an auxiliary tank for the liquefied gas arranged in indirect heat exchange relationship with the fuel storage container, an auxiliary conduit connecting the first-mentioned liquefied gas tank with the auxiliary tank, an adjustable valve means in the auxiliary conduit for controlling the liquefied gas flow through the auxiliary conduit into the auxiliary tank, an auxiliary outlet conduit for evaporated liquefied gas in said auxiliary tank, said auxiliary outlet conduit leading into said outlet means, and an adjustable vacuum pump in said auxiliary conduit for reducing the pressure in the auxiliary tank.

5. The fuel storage installation of claim 4, further comprising heating means for the liquefied gas tank and the fuel storage container, said heating means comprising electrical resistance heating means and a voltage source.

6. The fuel storage installation of claim 5 wherein the heat energy supply is controlled by the operating pressure of said fuel cell.

7. The fuel storage installation of claim 4, wherein the auxiliary connecting conduit and the auxiliary outlet conduit pass through the fuel storage tank.

References Cited

UNITED STATES PATENTS

| | | | |
|---|---|---|---|
| 1,084,116 | 1/1914 | Slick et al. | 206—.7 |
| 2,328,647 | 9/1943 | Jackson | 62—52 |
| 2,532,708 | 12/1950 | Goddard. | |
| 2,651,921 | 9/1953 | Du Rant. | |
| 2,663,626 | 12/1953 | Spangler | 62—48 X |
| 2,842,942 | 7/1958 | Johnston et al. | 62—50 |
| 2,964,916 | 12/1960 | Keeping | 62—48 |
| 2,996,893 | 8/1961 | Goodenough et al. | 62—53 X |
| 3,092,972 | 6/1963 | Poorman et al. | 62—48 X |
| 3,108,445 | 10/1963 | Portzer et al. | 62—48 |
| 3,133,422 | 5/1964 | Paivanas et al. | 62—50 |
| 3,141,796 | 7/1964 | Fay et al. | 136—86 |
| 3,162,716 | 12/1964 | Silver | 62—45 X |
| 3,180,763 | 4/1965 | Miller et al. | 136—86 |

FOREIGN PATENTS

| | | |
|---|---|---|
| 616,031 | 3/1961 | Canada. |

ALLEN B. CURTIS, *Primary Examiner.*

WINSTON A. DOUGLAS, *Examiner.*